No. 860,030. PATENTED JULY 16, 1907.
D. J. JENKINS.
APPARATUS FOR REMOVING SCALE FROM BOILER TUBES.
APPLICATION FILED DEC. 21, 1906.

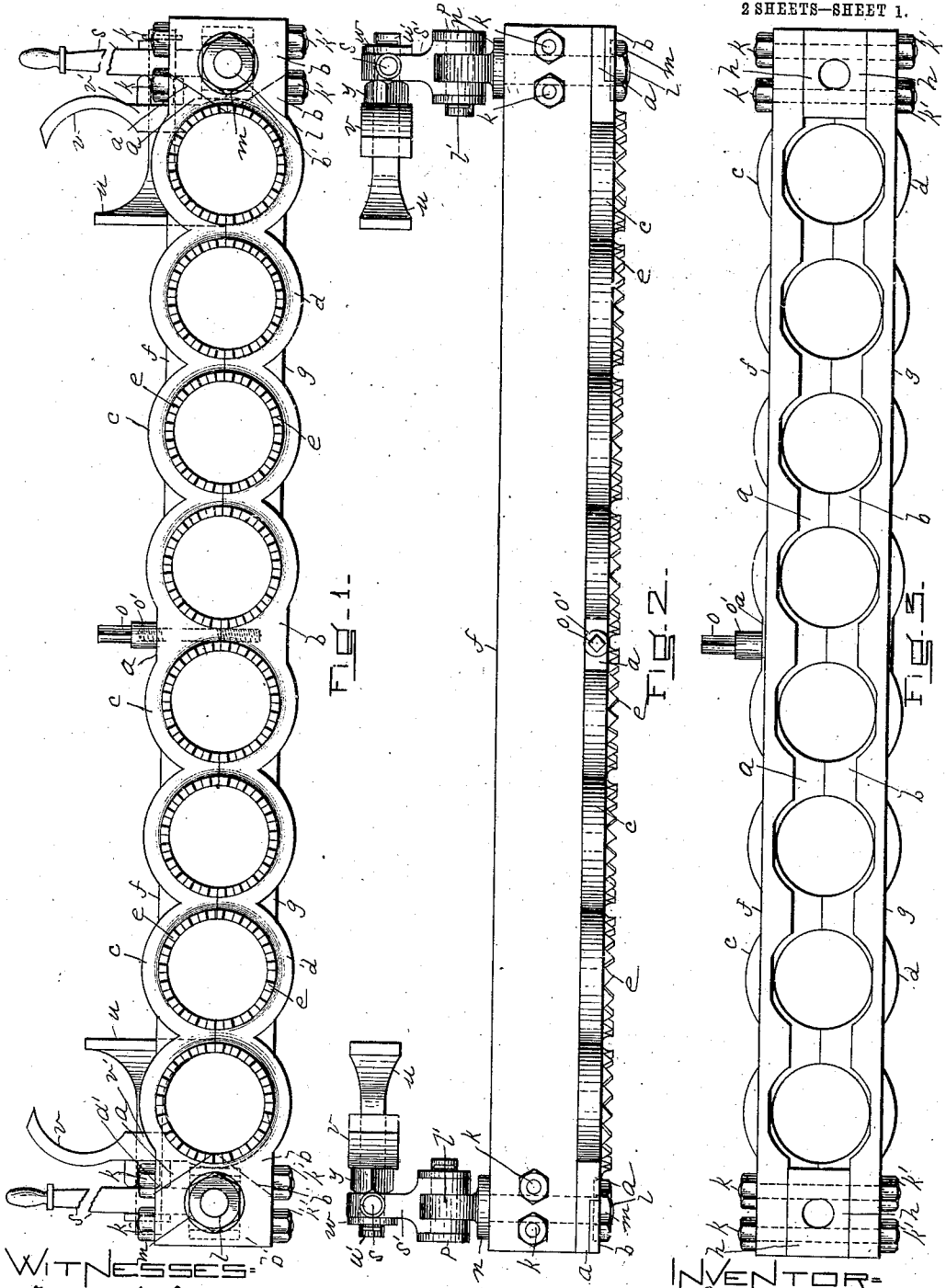

2 SHEETS—SHEET 2.

WITNESSES=
Frank G. Parker
A. F. Hood

INVENTOR=
David J. Jenkins,
By his Atty
Henry W. Williams

UNITED STATES PATENT OFFICE.

DAVID J. JENKINS, OF CARDIFF, ENGLAND.

APPARATUS FOR REMOVING SCALE FROM BOILER-TUBES.

No. 860,030.          Specification of Letters Patent.          Patented July 16, 1907.

Application filed December 21, 1906. Serial No. 348,845.

*To all whom it may concern:*

Be it known that I, DAVID J. JENKINS, a subject of the King of Great Britain, residing in Cardiff, Glamorgan, Wales, England, have invented a new and Improved Apparatus for Removing Scale from Boiler-Tubes, of which the following is a specification.

This is a device for removing scale or other foreign substance from the outer surfaces of boiler-tubes, and it is designed more particularly, but not necessarily exclusively, for use in connection with marine boilers; and the invention consists in the novel construction and arrangement of parts fully described and claimed below, and illustrated in the accompanying drawings, in which:—

Figure 4:
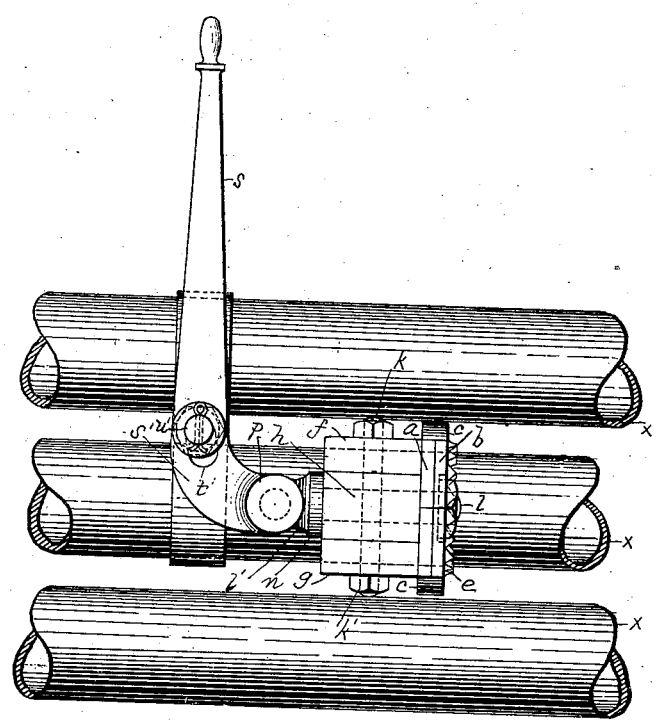
Figure 5:
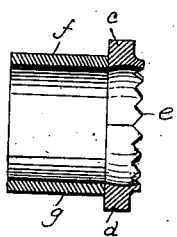
Figure 6:
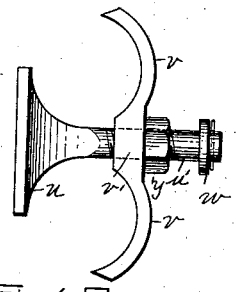

Figure 1 is a front elevation of my device, in a closed position. Fig. 2 is a plan view of the same. Fig. 3 is a rear view with the handles and the clamps removed. Fig. 4 is an enlarged end view showing it in operation, a portion of the boiler-tubes being illustrated. Fig. 5 is a vertical section taken through one of the cleaners and the back-plates. Fig. 6 is a front view of one of the holding clamps detached.

$a$ and $b$ represent respectively upper and lower horizontal bars, made preferably of metal, which are formed respectively on their lower and upper surfaces into arc-shaped portions $c$ and $d$, all of which are provided with teeth $e$ which project forward and slightly inward, as they are substantially of the shape and arrangement of saw-teeth. Each of the upper portions $c$ constitutes a complete one-half circle, and the same is true of each of the lower portions $d$, whereby each pair $c$ and $d$ constitute when the parts are in position a complete circular tube-cleaner with a complete circular row of teeth. At the rear of the upper and lower bars $a$ and $b$ are upper and lower back-plates $f$ and $g$, which act as supporting plates or strengthening plates, and between the back-plates at the opposite ends of the device are blocks $h$, said blocks and upper and lower back-plates being rigidly secured together by pairs of bolts $k$ and nuts $k'$. The opposite ends of the upper bars $a$ extend behind the opposite ends of the lower bars $b$, as indicated in Figs. 1, 2 and 4, the diagonal lines $a'$ in Fig. 1 indicating the ends of the front surfaces of said bars $a$, at which point they are recessed in order to extend behind the bars $b$, and the dotted lines $b'$ in Fig. 1 indicating the position of the extreme ends of said bars $a$ behind the bars $b$. The opposite ends of the bars $a$ and $b$ therefore are substantially of the shape of parallel plates, and they are held together by bolts $l$ having nuts $m$ on their front ends, said bolts extending horizontally through the plates $a$ and $b$ and the blocks $h$. These bolts are provided with integral flanges $n$ between which and the said nuts the plates $a$, $b$ and the blocks $h$ are held. A strengthening pin $o$ is screwed downward through the upper bar $a$ and into the lower bar $b$, said bars at that point being broadened between the adjacent cleaners, thus providing a seat on the upper surface of the bar $a$ for the shoulder or head $o'$ of said screw.

The bolts $l$ are provided at the rear of the flanges $n$ with extensions $l'$ which are pivotally connected at $p$ to the lower curved ends $s'$ of substantially vertical handles $s$. Each of these handles is slotted at $t$, as indicated in Fig. 4, to receive pivotally the shank $u'$ (Figs. 2, 4 and 6) of the upturned jaw $u$, said shank extending horizontally through the central portion $v'$ of the double jaw $v$—the portion of the shank in the slot and in the double jaw being adjusted by means of the ring or washer $w$ and the nut $y$, and said jaws constituting a clamp for engagement with the tubes $x$ of the boiler.

The two bars $a$ and $b$ with their integral portions $c$ and $d$ which constitute the cleaners, together with the upper and lower back-plates $f$ and $g$ are applied to a row of boiler-tubes $x$, the portions $a$, $c$ and $f$ being above the row of tubes and the portions $b$, $d$ and $g$ being below said row. The blocks $h$ are bolted in position, and the clamps $v$, $u$ are applied to the boiler-tubes by placing the concave surfaces of the jaws $v$ against one surface of two vertically adjacent boiler-tubes and the jaw behind one of the tubes. After the bolts $k$ and $l$ have been placed in position the device is exactly as illustrated in Figs. 1, 2 and 3 as regards the arrangement of its parts and is in the position indicated in Fig. 4 with relation to the boiler-tubes. By working the handles $s$ back and forth the cleaners $c$ are moved simultaneously on the boiler-tubes and operate effectually to remove scale and any other foreign substance therefrom. The cleaners are advanced along the tubes by moving the clamps until all the scale has been scraped off.

As is evident, the adjustment of the cleaners on the tubes is easily regulated by the bolts $k$ and nuts $k'$, and the adjustment of the clamps on the tubes may be regulated by the nuts $y$.

Having thus fully described my invention, what I claim and desire to secure by Letters-Patent, is:—

1. An apparatus for removing scale from boiler-tubes, comprising parallel bars each provided with a row of arc-shaped portions $c$ and $d$ provided with teeth $e$; horizontal back-plates parallel with said bars $c$ and $d$; blocks located at the opposite ends of said bars between the back-plates; a centrally located strengthening bolt connecting said bars; and means for securing said bars, blocks, and back-plates together whereby said arc-shaped portions will be placed opposite each other and each portion $c$ and $d$ constitute a complete circular cleaner.

2. An aparatus for removing scale from boiler-tubes, comprising parallel bars each provided with a row of arc-shaped portions $c$ and $d$ provided with teeth $e$; means for securing said bars together whereby the said arc-shaped portion will be placed opposite each other and each portions $c$ and $d$ constitute a complete circular cleaner; clamps adapted to be applied to the boiler-tubes; and mechanism intermediate of the clamps and said bars whereby the bars and cleaners can be moved over the surface of the tubes with relation to the clamps.

3. An apparatus for removing scale from boiler-tubes, comprising parallel bars each provided with a row of arc-shaped portions $c$ and $d$ provided with teeth $e$; clamps comprising the jaws $v$ and $u$ and means for adjusting the same with relation to each other, said clamps being located at right angles to the boiler-tube and adapted to be rigidly and removably secured thereto; and handles or levers intermediate of the clamps and said bars whereby said bars and cleaners can be moved over the surface of the tubes, for the purpose set forth.

In testimony whereof I have signed my name to this specification in the presence of two subscribing witnesses.

DAVID J. JENKINS.

Witnesses:
  JAMES TRENCHARD,
  JOHN MASON SHARP.